Patented Feb. 22, 1927.

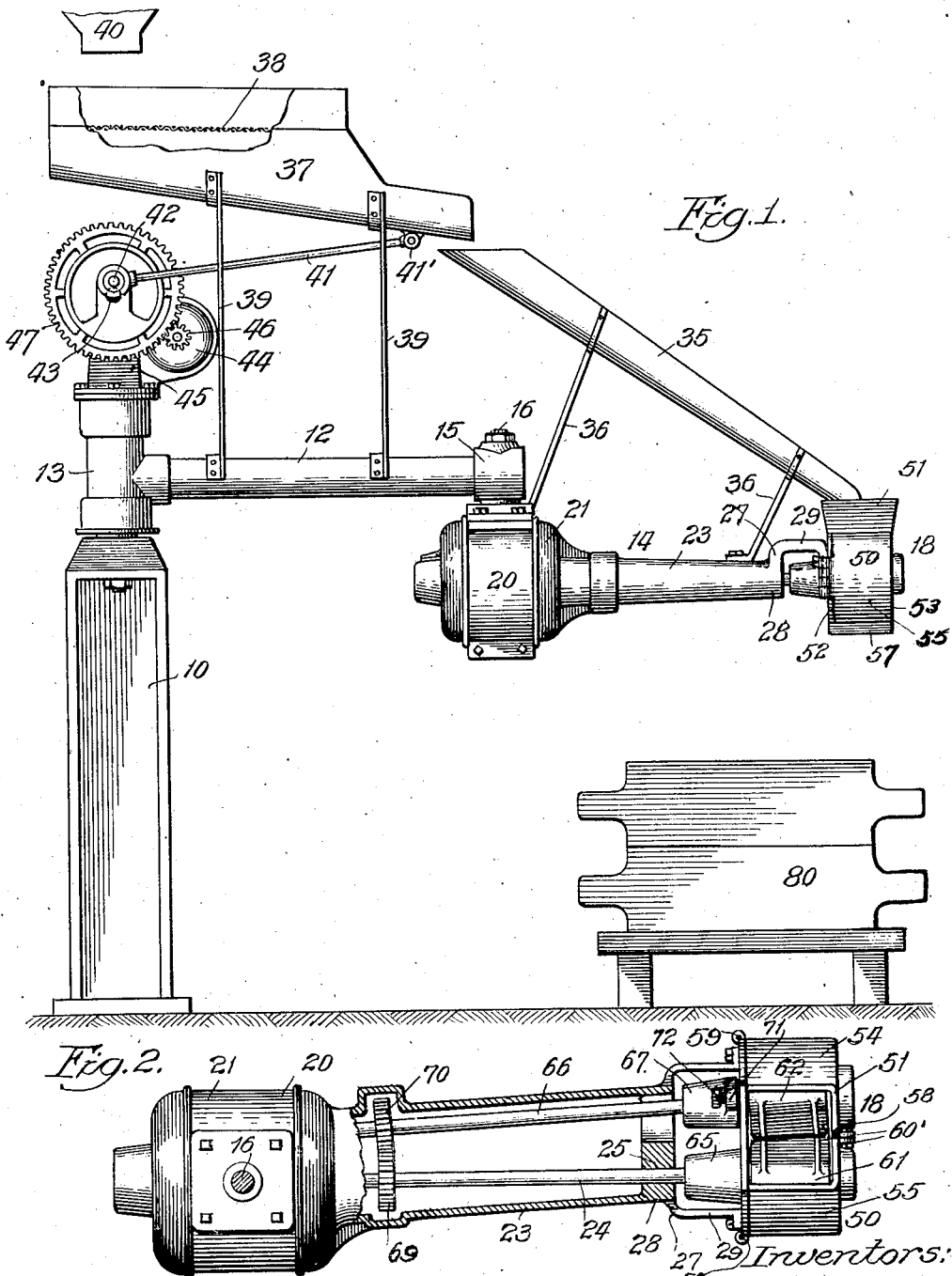

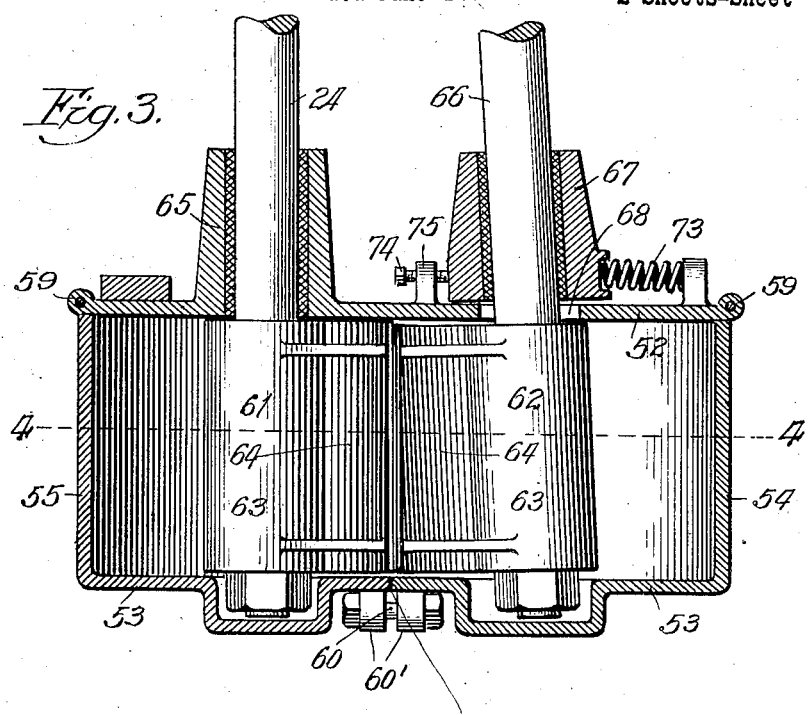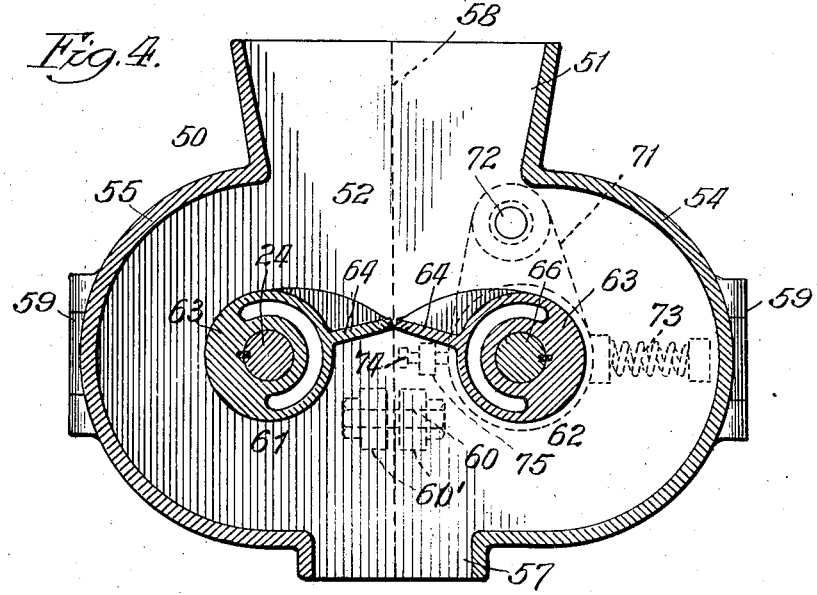

1,618,630

UNITED STATES PATENT OFFICE.

ELMER O. BEARDSLEY, OF CHICAGO, AND WALTER F. PIPER, OF OAK PARK, ILLINOIS, ASSIGNORS TO THE BEARDSLEY & PIPER COMPANY, OF CHICAGO, ILLINOIS, A CORPORATION OF ILLINOIS.

MOLDING MACHINE.

Application filed June 11, 1921. Serial No. 476,804.

The invention relates to molding machines and more particularly to that type in which the sand or mold-material is forcibly projected into the mold by a rotor.

The object of the invention is to provide a machine with a projector head which is adapted for the high speed rotation necessary to make good molds and in which the projecting blades are comparatively short. This result is attained, primarily, by employing a pair of coacting oppositely rotating projector-blades, as contradistinguished from a single blade.

The invention consists in the several novel features hereinafter set forth and more particularly defined by claims at the conclusion hereof.

In the drawings: Fig. 1 is a side elevation of a machine embodying the invention. Fig. 2 is a plan of the projector-head and the arm by which it is supported. Fig. 3 is a horizontal section through the projector head. Fig. 4 is a vertical section taken on line 4—4 of Fig. 3.

The invention is illustrated as embodied in a machine comprising a mast 10 on the upper end of which is suitably journalled for horizontal rotation a jib 12 which has its socket 13 around the upper end of a post secured to the upper end of the mast. An arm 14 is pivoted to the distal end of a jib by means of a stud 16 which is rotatably held in a socket 15 which is fixed to the jib 12. The projector head 18 is supported by the outer end of the arm 14 and this jib and arm exemplify a support for the projector head which permits the latter to be moved horizontally in any direction so that the head can be moved to discharge the sand into all portions of a flask and to completely fill all portions of the mold. This movement of the projector head is effected without varying the angle of delivery of the sand into the mold. The arm 14 comprises a casing 20 of an electric motor 21 to which the stud 16 is suitably secured and a hollow sleeve 23, which is bolted to one side of said casing, supports the ramming head 18 and contains a shaft 24 which is connected to the armature of the motor 21 and driven thereby. This shaft is mounted in bearings 25 in the sleeve 23. A yoke for supporting the casing of the projector-head comprises a hub 28 which is rigidly secured to the sleeve, radial arms 27 and outwardly extending members 29 and the inner side wall of the projector-casing is rigidly secured to said members.

A conveyor chute 37, containing a suitable sieve or riddle 38 is supported from the jib 12 by resilient bars 39 which have their ends respectively secured to the jib and to the chute. The inner end of chute 37 is adapted to receive sand from a suitable source of supply, such as a hopper 40, to which sand will be fed in any desired manner. The outer end of chute 37 discharges the sand into the open upper end of an inclined chute 35 which is fixedly mounted on the arm 14 and is supported by bars 36 so that the chute will remain in fixed relation to said arm and the ramming head. The upper end of the chute 35 and the outer end of the chute 37 are aligned with the axis about which the arm 14 swings so that relative movement of the chutes will maintain the discharge into the chute 35. Chute 37 and the riddle therein are vibrated by a pitman 41 which is pivoted at 41' to the chute 37 and is operatively connected to an eccentric or wrist-pin 42 on a gear 47 which is fixed to a shaft 43 that is journalled in a bracket 45 which is fixed to the upper end of the socket 13. An electric motor 44 is also mounted on said bracket and a pinion 46 on the shaft of said motor meshes with, and drives, the gear 47. The motor 44 and gearing for operating the chute 37, being mounted in the bracket 45 which is fixed to the socket 13 of the arm 12, will move horizontally with said arm.

The casing 50 of the projector-head 18 comprises an inner end wall 52, an outer end wall 53, curved side-walls 54 and 55, a hopper 51 at the top thereof with an opening therein through which sand discharged from the chute 35 will be delivered into the casing, and a discharge opening 57 in the bottom of the casing. Preferably, the casing is sectionally formed to provide a casing that can be opened for access to the rotors therein. The inner end-wall 52 is separately formed from the end and outer side wall. The outer side wall of the casing is formed of sections abutting at 58 and with the side walls 54 and 55 respectively, and each of these sections is hinged, as at 59, to one end of the back plate 52 so that when the outer wall sections are swung laterally ready access may be had to the mechanism in the casing. A bolt 60 extending through lugs 60' on the pivotal casing sections respectively is adapted to secure them together and in position to close the casing. When access is desired to the projector-head, it is only necessary to remove the bolt 60 and swing the pivotal sections outwardly about their respective pivots.

The projection of the sand is effected by a pair of oppositely rotating coacting rotors 61 and 62, each of which comprises a hub or body 63 and a projector-blade 64 integral with the hub or body. The hub of the rotor 61 is keyed to the motor-shaft 24 which extends through a bearing 65 on the inner wall 52 of the projector casing. The hub of the rotor 62 is keyed to a shaft 66 which extends through and sustained by a bearing 67 and through a slot 68 in the wall 52 of the projector-casing. Shaft 66 and rotor 62 are driven from motor-shaft 24 by gears 69 and 70 which mesh with each other and are respectively secured to shafts 24 and 66. In practice it sometimes occurs that pieces of scrap are present in the sand delivered to the projector, and to prevent injury to the coacting projector-blades, if such scrap becomes wedged between the ends thereof, the bearing 67 for the shaft 66 is supported by an arm 71 which is pivoted, as at 72, to the wall 52, and this bearing is pressed towards the shaft 24 by a spring 73. A screw 74 threaded through a lug 75 serves as an adjustable stop to limit the movement of the rotor 62 towards the rotor 61. This spring and movable bearing exemplify means for yieldingly holding one rotor in coacting relation with the other to permit the rotors to be separated by the scrap.

In the operation of the machine, a flask 80 is placed beneath and within range of movement of the projector-head and about a foot below the lower end of the head. The delivery of sand from chute 35 is substantially continuous, but the rotors moving at a high speed, sufficient to impart to the sand a velocity ranging from 4000 to 8000 feet per minute, will divide the stream into wads coacting with each other to shear the stream into wads. The rotors will project the wads downwardly in rapid succession through the opening 57 into the flask. The operation of the rotors at high speed indicated will produce good molds very rapidly, the bodies of the rotors are spaced apart sufficiently so that the sand will not be compressed between them, so that the blades travelling at high speed will sling or project the wads sheared from the stream at a high velocity and with sufficient force to densify the sand in the flasks.

A characteristic of the machine described is that comparatively short projector blades may be used. Another characteristic is that the projector blades, as they approach each other, cooperate to shear a wad of sand from the stream. Another characteristic is that provision is made for yieldingly holding the rotors in cooperating relation, so that scraps of metal caught between the blades will not destroy the rotor.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In a molding machine, the combination of a pair of coacting rotors each provided with a projecting-blade, the blades having sufficient clearance in front of them to permit wads of sand to be freely projected therefrom, mechanism for driving the rotors at high speed, and means for movably supporting the rotors.

2. In a molding machine, the combination of a pair of coacting rotors each provided with a substantially cylindrical body and a projecting-blade, the bodies having their peripheries spaced apart sufficiently to permit the sand to freely pass between them, the blades having sufficient clearance in front of them to permit wads of sand to be freely projected thereby, mechanism for driving the rotors at high speed, and means for movably supporting the rotors.

3. In a molding machine, the combination of a casing, a pair of coacting rotors, each provided with a body and a projecting-blade, the blades having sufficient clearance in front of them to permit the sand to be freely projected therefrom, mechanism for driving the rotors at high speed, and means for movably supporting the casing.

4. In a molding machine, the combination of a casing, a pair of coacting rotors, each provided with a substantially cylindrical body and a projecting-blade, the bodies being spaced apart sufficiently to permit sand to freely pass between them with sufficient clearance in front of the blades to permit the sand to be freely projected therefrom, mechanism for positively driving the rotors at high speed, and means for movably supporting the casing.

5. In a molding machine, the combination of a pair of coacting rotors, each provided with a body and single projecting-blade, the bodies of the rotors being formed to provide clearance for the passage of sand substantially around their entire periphery so the blades will freely project wads of sand into flasks, mechanism for positively and synchronously driving the rotors at high speed, and means for supporting the rotors to permit bodily horizontal movement.

6. In a molding machine, the combination of a casing, a pair of coacting rotors in the casing, each provided with a single projecting-blade, and a body having a cylindrical periphery in front of the blade, the peripheries being spaced apart sufficiently to provide sufficient clearance in front of the blades, for the free projection of wads of sand into flasks, mechanism for positively and synchronously driving the rotors at high speed, and means for supporting the rotors to permit bodily horizontal movement.

7. In a molding machine, the combination of a pair of coacting rotors each having a body and a projector-blade, each body having a substantially cylindrical peripheral portion in front of the blade to provide sufficient clearance for the free projection of sand at high speed, mechanism for positively and synchronously driving the rotors in opposite directions and at high speed, and means for feeding mold material between the rotors.

8. In a molding machine, the combination of a pair of coacting rotors each provided with a body and a projecting-blade, the blades having sufficient clearance in front of them, and the peripheries of the bodies being spaced apart sufficiently to permit the free projection of the sand by the blades, mechanism for positively and synchronously driving the rotors in opposite directions, means for feeding mold material to the rotors, and a horizontally swinging arm on which the rotors and driving mechanism are mounted.

9. In a molding machine, the combination of a pair of coacting rotors each provided with a projector-blade, the blades having sufficient clearance in front of them to permit wads of sand to be fully projected therefrom, mechanism for positively driving the rotors at high speed, the blades being positioned to coact with each other in the projection of wads of sand from a stream, and means for movably supporting the rotors.

10. In a molding machine, the combination of a pair of coacting rotors, each provided with a body and a single projecting-blade, the bodies of the rotors having a substantially cylindrical peripheral portion in front of the blades to provide sufficient clearance for the free projection of sand at high speed, mechanism for positively and synchronously driving the rotors in opposite directions and at high speed, the blades being timed to coact with each other in the projection of the wads, and means for feeding mold material between the rotors.

11. In a molding machine, the combination of an arm, a projector head supported by said arm and comprising a plurality of rotors and a casing, a shaft supported by said arm and to which one of the rotors is fixed, gearing between said shaft and the other rotor, means for driving said shaft and means for delivering mold-material to the casing.

12. In a molding machine, the combination of an arm, a projector-head supported by said arm and comprising a plurality of rotors and a casing, a shaft supported by said arm and to which one of the rotors is fixed, gearing between said shaft and the other rotor, means for supporting the latter rotor yieldably with respect to the other rotor, a motor for positively driving said shaft and means for delivering mold-material to the casing.

13. In a molding machine, the combination of a pivoted arm, a projector head supported on said arm and comprising a plurality of rotors and a casing, a shaft supported by said arm and to which one of the rotors is fixed, gearing between the shaft and the other rotor for positively driving it, a pivoted arm for movably supporting the first mentioned arm, a motor for driving said shaft fixedly secured to the arm by which the head is carried, and means for delivering mold material to the casing.

14. In a molding machine, the combination of a projector-head comprising a casing and a rotor, the casing comprising a side wall and a hinged section, means for driving the rotor and means for feeding material to the head.

15. In a molding machine, the combination of a projector-head comprising a casing and a plurality of rotors, the casing comprising a side wall and a plurality of sections removably secured to the side wall to permit access to the rotors, mechanism for driving the rotors, and means for delivering sand to the head.

16. In a molding machine, the combination of a movably supported sleeve and electric motor to which the sleeve is secured, a projector-head supported by the sleeve and comprising a plurality of rotors, a shaft in said sleeve, means for driving both of said rotors from said shaft and means for delivering mold-material to the head.

17. In a molding machine, the combination of a projector-head comprising a casing and a plurality of rotors, means for driving the rotors, means for delivering mold-material to the head and means for movably supporting the head so as to permit it to be moved laterally without varying the angle of projection of the material.

18. In a molding machine, the combination of a projector-head comprising a casing and a plurality of rotors, means for driving the rotors, means for delivering mold-material to the head and means for movably supporting the head so as to permit it to be moved laterally without varying the angle of projection of the material comprising a jib and an arm pivoted to the jib.

19. In a machine for filling flasks, the combination of a horizontally swinging arm, a rotor provided with a projecting-member, a casing on one end of the arm and enclosing the rotor, and a shaft for driving the rotor extending into one end of the casing, the casing being provided with a removable cover extended to enclose the end of the shaft in the casing and the outer side of the rotor.

20. In a machine for filling flasks, the combination of a movable support, a pair of rotors, each provided with a projecting member, a casing around the rotors secured at one of its ends to said support, shafts for the rotors extending into one end of the casing, the casing being provided with movable means to enclose the outer side of the rotors and the outer ends of the shafts.

ELMER O. BEARDSLEY.
WALTER F. PIPER.